(12) United States Patent
Lee

(10) Patent No.: US 8,931,062 B2
(45) Date of Patent: Jan. 6, 2015

(54) REMOTE DISPLAYING

(75) Inventor: Hyoung-Gon Lee, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 21 days.

(21) Appl. No.: 13/505,650

(22) PCT Filed: Nov. 10, 2011

(86) PCT No.: PCT/US2011/060099
§ 371 (c)(1),
(2), (4) Date: May 2, 2012

(87) PCT Pub. No.: WO2013/070220
PCT Pub. Date: May 16, 2013

(65) Prior Publication Data
US 2013/0125212 A1    May 16, 2013

(51) Int. Cl.
*G06F 21/00*     (2013.01)
*H04L 29/06*    (2006.01)
*H04N 21/45*    (2011.01)
*H04N 21/436*   (2011.01)
*H04N 21/41*    (2011.01)
*H04N 21/4363*  (2011.01)
*H04N 21/4627*  (2011.01)

(52) U.S. Cl.
CPC ..... *H04N 21/43615* (2013.01); *H04N 21/4516* (2013.01); *H04N 21/4126* (2013.01); *H04N 21/4122* (2013.01); *H04N 21/43637* (2013.01); *H04N 21/4627* (2013.01)
USPC ...................... 726/4; 726/6; 713/150; 380/44

(58) Field of Classification Search
USPC .............................. 726/4, 6; 380/44; 713/150
See application file for complete search history.

(56) References Cited

U.S. PATENT DOCUMENTS

| 2009/0061841 | A1 | 3/2009 | Chaudhri et al. |
| 2009/0125971 | A1 | 5/2009 | Belz et al. |
| 2010/0023599 | A1 | 1/2010 | Azuma et al. |
| 2010/0080383 | A1* | 4/2010 | Vaughn et al. ................ 380/44 |

(Continued)

FOREIGN PATENT DOCUMENTS

WO    WO 2012151690 A1 * 11/2012

OTHER PUBLICATIONS

Kyeongwon Choi; Changbin Lee; Woongryul Jeon; Kwangwoo Lee; Dongho Won; "A mobile based anti-phishing authentication scheme using QR code"; Mobile IT Convergence (ICMIC); Publication Year: Jan. 2011; pp. 109-113.*

(Continued)

*Primary Examiner* — Andrew Nalven
*Assistant Examiner* — Courtney Fields
(74) *Attorney, Agent, or Firm* — Brundidge & Stanger, P.C.

(57) ABSTRACT

Technologies are generally described for a remote displaying scheme configured to transmit display data stored in a source device to a target device for displaying the display data on the screen of the target device. In some examples, a method performed under control of a source device may include broadcasting to one or more target devices request information that comprises a request for displaying display data, obtaining permission information generated by a target device of the one or more target devices, the permission information based, at least in part, on the request information, transmitting to the target device an acknowledgement that a communication channel between the source device and the target device is established, the acknowledgement based, at least in part, on the permission information and transmitting to the target device the display data based, at least in part, on the permission information.

26 Claims, 9 Drawing Sheets

(56) References Cited

U.S. PATENT DOCUMENTS

| | | |
|---|---|---|
| 2011/0096354 A1 | 4/2011 | Liu |
| 2011/0145427 A1 | 6/2011 | Amento et al. |
| 2012/0084846 A1* | 4/2012 | Weis et al. .................. 726/6 |

OTHER PUBLICATIONS

"Connect Your Laptop to Your TV with Intel® Wireless Display," Accessed at http://web.archive.org/ web/20111107010049/http://www.intel.com/content/www/us/en/architecture-and-technology/intel-wireless-display.html, Accessed on Sep. 14, 2014, pp. 3.

"In the Beginning, There Was Obfuscation," accessed at http://web.archive.org/web/20110829055126/http://www.oreillynet.com/wireless/2002/04/19/security.html, accessed on Sep. 14, 2014, pp. 4.

International Search Report and Written Opinion for counterpart International Patent Application No. PCT/US2011/060099 mailed Mar. 16, 2012.

\* cited by examiner

FIG. 2
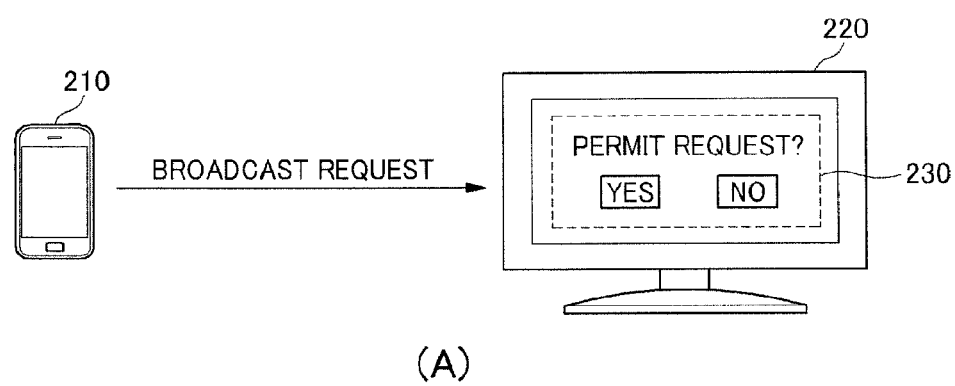
(A)
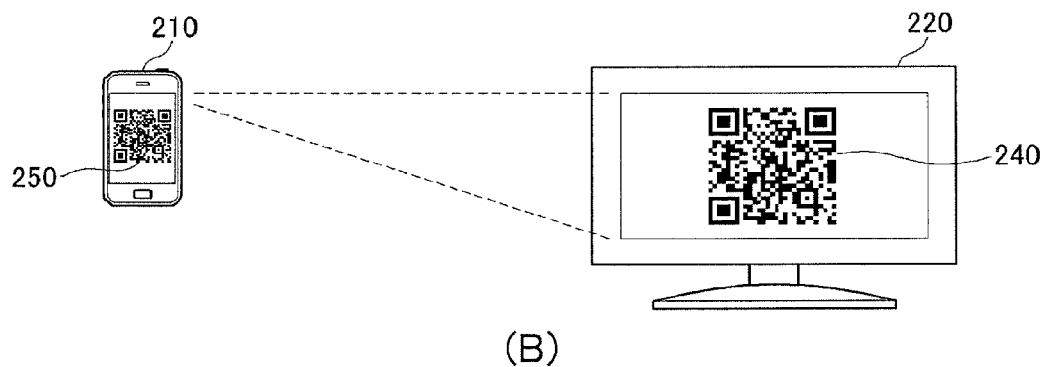
(B)

FIG. 3
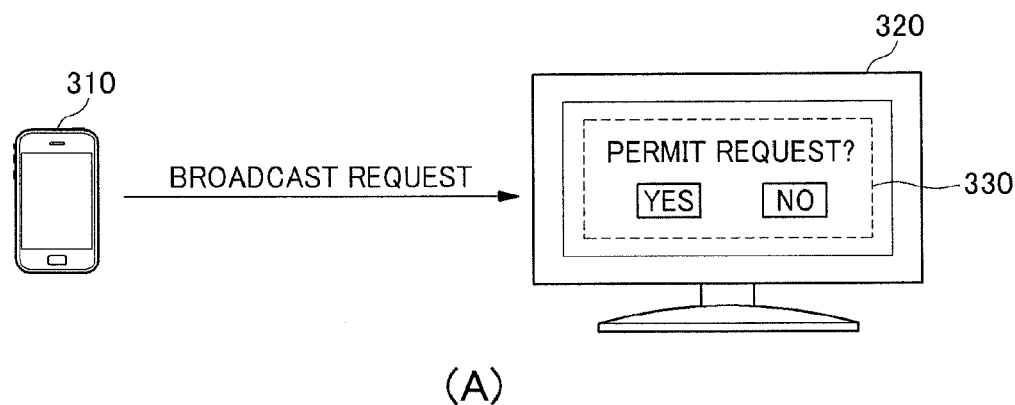
(A)
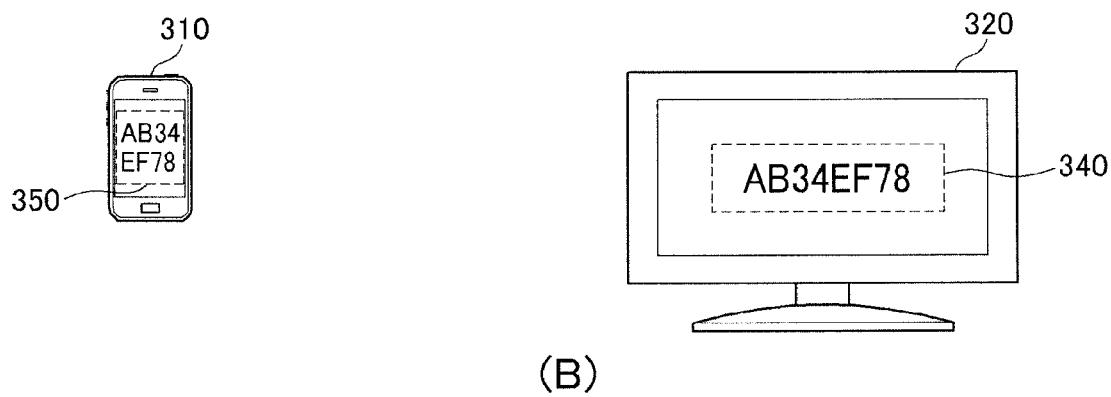
(B)

REMOTE DISPLAYING

CROSS-REFERENCES TO RELATED APPLICATIONS

The present application is the national stage application of PCT/US2011/060099, filed on Nov. 10, 2011, the entirety of which is incorporated herein.

BACKGROUND

Unless otherwise indicated herein, the approaches described in this section are not prior art to the claims in this application and are not admitted to be prior art by inclusion in this section.

Recent developments in ubiquitous computing ("ubicomp") technologies have changed our daily life. With ubicomp technologies, various devices including mobile phones and home appliances may interact with each other to operate as a computing device. For example, we may use mobile phones as a movie player and TVs as an internet browser. Meanwhile, the present wireless communication technologies allow data transmission of relatively big data among ubicomp devices. Thus, it may be possible for a user of a ubicomp device to remotely display data stored in his/her device on another device. In such a case, the user may transmit the data to another device via a communication network, and in doing so, it may be required to verify the communication network and to securely transmit the data.

SUMMARY

In an example, a method performed under control of a source device may include broadcasting to one or more target devices request information that comprises a request for displaying display data, obtaining permission information generated by a target device of the one or more target devices, the permission information based, at least in part, on the request information, transmitting to the target device an acknowledgement that a communication channel between the source device and the target device is established, the acknowledgement based, at least in part, on the permission information and transmitting to the target device the display data based, at least in part, on the permission information.

In an example, a method performed under control of a target device may include receiving from a source device request information that comprises a request for displaying display data, determining whether to permit the request for displaying the display data, generating a permission information based, at least in part, on the determining and displaying the permission information on a screen of the target device.

In an example, a device comprising a processor, a camera and a memory storing instructions for execution by the processor, wherein the instructions, when executed by the processor, cause the processor to perform a method that may include broadcasting to one or more target devices request information that comprises a request for displaying display data, obtaining, by the camera, an image displayed on a screen of a target device of the one or more target devices, identifying permission information from the obtained image, the permission information based, at least in part, on the request information, transmitting to the target device an acknowledgement that a communication channel between the device and the target device is established, the acknowledgement based, at least in part, on the permission information and transmitting to the target device the display data based, at least in part, on the permission information.

In an example, a device may include a receiving unit configured to receive from a source device request information that comprises a request for displaying display data, a determining unit configured to determine whether to accept the request for displaying the display data, a generating unit configured to generate a permission information based, at least in part, on the determination and a displaying unit configured to display the permission information.

In an example, a computer-readable storage medium having stored thereon computer-executable instructions that, in response to execution, cause a source device to perform operations that may include broadcasting to one or more target devices request information that comprises a request for displaying display data, obtaining permission information generated by a target device of the one or more target devices, the permission information based, at least in part, on the request information, transmitting to the target device an acknowledgement that a communication channel between the source device and the target device is established, the acknowledgement based, at least in part, on the permission information and transmitting to the target device the display data based, at least in part, on the permission information.

In an example, a computer-readable storage medium having stored thereon computer-executable instructions that, in response to execution, cause a target device to perform operations that may include receiving from a source device request information that comprises a request for displaying display data, determining whether to permit the request for displaying the display data, generating a permission information based, at least in part, on the determining and displaying the permission information on a screen of the target device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2 schematically shows an illustrative example of a source device that obtains permission information by capturing the permission information (which is an image code) displayed on a screen of a target device;

FIG. 3 schematically shows an illustrative example of a source device that obtains permission information by a user input of the permission information (which is a text code) displayed on a screen of a target device;

Figure 1:
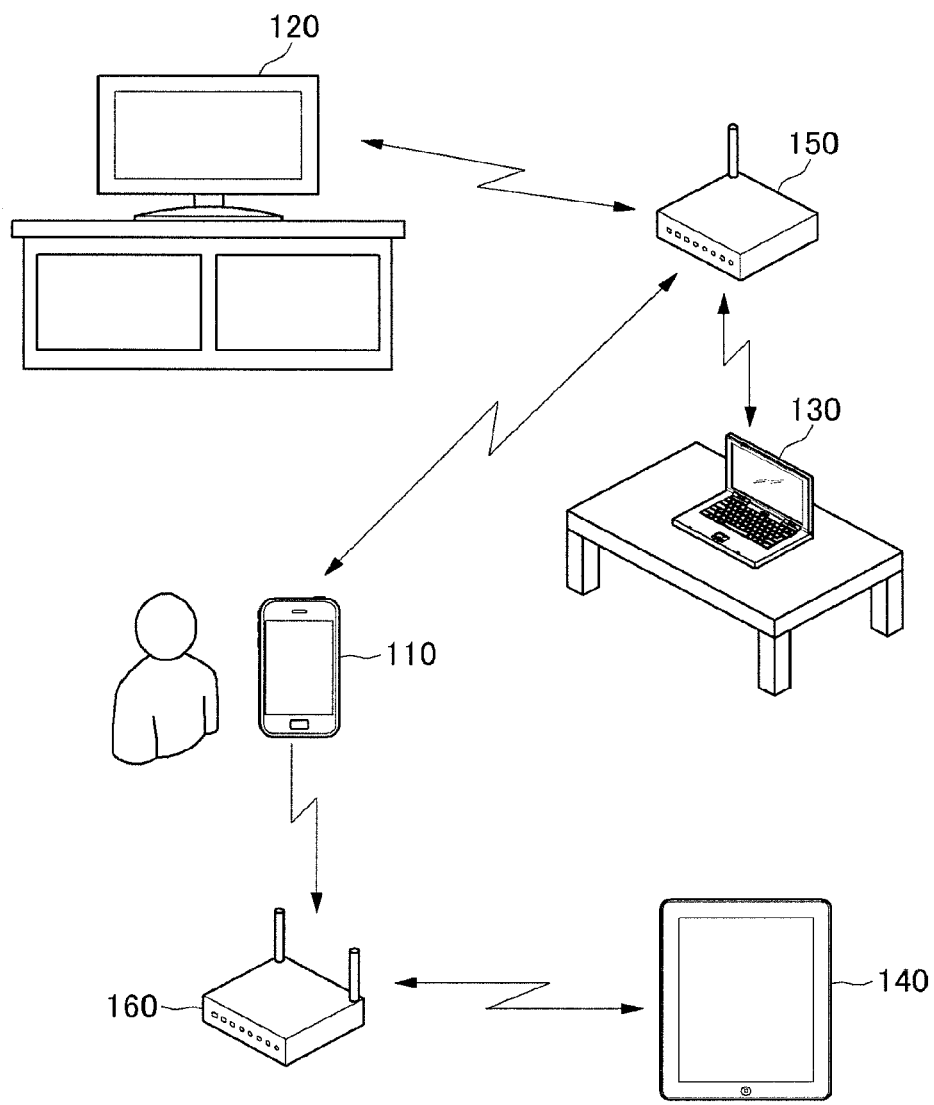
FIG. 1 schematically shows an illustrative example of an environment where a source device communicates with one or more target devices in order to transmit display data to a target device for remote displaying.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to remote displaying.

Briefly stated, technologies are generally described for a remote displaying scheme configured to transmit display data stored in a source device to a target device (which includes a screen) for displaying the display data on the screen of the target device. In some examples, a source device may broadcast to one or more target devices request information that includes a request for displaying display data stored in the source device. By way of example, but not limitation, the source device may broadcast the request information to one or more target devices positioned close to the source device. The request information may include information about the source device and information about the display data.

In some examples, at least one target device of the one or more target devices may generate permission information in response to the request information. By way of example, but not limitation, the at least one target device may generate respective permission information which may include information about a communication network, an authentication code to access the communication network and an authentication code to protect the display data. The at least one target device may display the respective permission information on its own screen. By way of example, but not limitation, the permission information displayed on the screen may include an image code (such as a quick response (QR) code) or a text code.

In some examples, a user of the source device may choose a target device of the at least one target device and obtain the permission information displayed on the screen of the target device. By way of example, but not limitation, the source device may obtain the permission information by capturing the screen displaying the permission information (when the permission information is a QR code) or by the user's input of the permission information (when the permission information is a text code). By way of example, but not limitation, if the permission information displayed on the screen of the target device is a QR code, a user of the source device may capture the QR code using a camera of the source device, and if the permission information is a text code, the user of the source device may input the text code using a key input function of the source device.

In some examples, the source device may transmit to the target device an acknowledgement that a communication channel between the source device and the target device is established. Then, the source device may transmit the display data to the target device based, at least in part, on the permission information, and the target device may display the display data on the screen of the target device.

FIG. 1 schematically shows an illustrative example of an environment where a source device communicates with one or more target devices in order to transmit display data to a target device for remote displaying in accordance with at least some embodiments described herein. As depicted in FIG. 1, a source device 110 may communicate with target devices 120, 130 and 140 through wireless access points 150 and 160. By way of example, source device 110 may include, but not limitation, a portable electronic device, such as, for example, a mobile phone, a smart phone, a personal digital assistant (PDA), a tablet computer, or a laptop computer. Also, target devices 120, 130 and 140 may include, but not limitation, an electronic device equipped with a screen and a communication function, such as, for example, a smart TV, a desktop computer, a laptop computer, or a tablet computer. In some embodiments, wireless access points 150 and 160 may be a Wi-Fi access point, and source device 110 may communicate with target devices 120, 130 and 140 via a Wi-Fi network.

Source device 110 may broadcast to target devices 120, 130 and 140 request information including a request that source device 110 wants to transmit display data stored therein for remote displaying by at least one of target devices 120, 130 and 140. In some embodiments, source device 110 may broadcast the request information without encryption. By way of example, but not limitation, the request information may be a broadcast message that does not designate a specific recipient, such as, for example, a beacon frame, or a probe request frame. In some embodiments, the request information may include information about source device 110 and information about the display data. By way of example, but not limitation, the information about source device 110 may include a device type, a device name, owner information, a supported communication method, and camera capability of source device 110. Also, the information about the display data may include, but not limitation, size, file type, file format and resolution of the display data.

Target devices 120, 130 and 140 may receive the request information and determine whether to permit the request of remote displaying from source device 110. Hereinafter, in the embodiments described with reference to FIG. 1, it will be described that target device 120 (which is communicatively coupled to wireless access point 150) interacts with source device 110 for remote displaying. However, one skilled in the art will appreciate that target device 130 (which is communicatively coupled to wireless access point 150) and target device 140 (which is communicatively coupled to wireless access point 160) may also be served as a target device for remote displaying like target device 120.

In some embodiments, target device 120 may display, in response to receiving of the request information, on a screen of target device 120 a message of asking a user of target device 120 whether to permit the request of remote displaying from source device 110. In such cases, target device 120 may determine whether to permit the request of remote displaying based, at least in part, on the user's input. Such determining process will be described more in detail with reference FIG. 2 below. On the other hand, in some embodiments, target device 120 may determine whether to permit the request of remote displaying based, at least in part, on at least one predetermined condition. By way of example, but not limitation, the at least one predetermined condition may include whether target device 120 is being used by another user, and/or whether the file type of the display data is supported by target device 120. Further, the at least one predetermined condition may include identity of a user of source device 110. If the at least one predetermined condition is met, target device 120 may determine to permit the request of remote displaying from source device 110.

In some embodiments, if target device 120 determines not to permit the request of remote displaying, target device 120 may ignore the request of remote displaying without performing any operation. On the other hand, if target device 120 determines to permit the request of remote displaying, target device 120 may generate permission information and display the permission information on the screen of target device 120.

In some embodiments, the permission information displayed on the screen of target device 120 may be an image code or a text code. By way of example, but not limitation, the image code may include a QR code and the text code may include an alphanumeric code. In some examples, when generating the permission information, target device 120 may determine the code type (i.e., an image code or a text code) based, at least in part, on the information about source device 110 included in the request information. By way of example, but not limitation, if the information about source device 110 indicates that source device 110 is a Smartphone equipped with a camera, target device 120 may generate the permission information in a form of a QR code. Similarly, if the information about source device 110 indicates that source device 110 does not have a camera and does have a key input function, target device 120 may generate the permission information in a form of a alphanumeric code.

In some embodiments, source device 110 may obtain the permission information displayed on the screen of target device 120. By way of example, but not limitation, if the permission information is a QR code, source device 110 may obtain the permission information by capturing the QR code using the camera of source device 110, and if the permission information is a alphanumeric code, source device 110 may obtain the permission information by the user's input of the alphanumeric code through the key input function of source device 110.

In some embodiments, source device 110 may communicatively couple to target device 120 based, at least in part, on the permission information. In such cases, the permission information may include information about a communication network and an authentication code to access the communication network. By way of example, but not limitation, the information about the communication network may include a communication method for remote displaying, and the authentication code to access the communication network may include a code with which source device 110 may access wireless access point 150. By way of example, but not limitation, the authentication code to access the communication network may be randomly generated by target device 120. In other examples, the authentication code to access the communication network may be a code which has been set up by wireless access point 150.

In some embodiments, source device 110 may transmit to target device 120 an acknowledgement that a communication channel between source device 110 and target device 120 is established. The acknowledgement may be generated based, at least in part, on the permission information. By way of example, but not limitation, the acknowledgement may be encrypted by an authentication code that may be included in the permission information.

In some embodiments, source device 110 may encrypt the display data based, at least in part, on the permission information. In such cases, the permission information may include an authentication code to protect the display data. By way of example, but not limitation, the authentication code to protect the display data may include a code with which source device 110 may encrypt the display data. By way of example, but not limitation, the authentication code to protect the display data may be randomly generated by target device 120.

In some embodiments, the permission information may further include an expiration time of the permission information. By way of example, but not limitation, the expiration time may be a specific time or a time period. At the specific time or after the time period, the communication network and its authentication code (both of which are newly created for remote displaying) and/or the authentication code to protect the display data may be automatically expired and no longer valid. In some embodiments, at the specific time or after the time period, target device 120 may ask the user of target device 120 whether to extend the expiration time. When the user of target device 120 chooses to extend the expiration time, the expiration time included in the permission information may be updated and target device 120 may continue to display the display data until the updated expiration time.

In some embodiments, source device 110 may transmit the display data (which may be encrypted with the authentication code to protect the display data as described above) to target device 120. Target device 120 may then receive the display data and, if the display data is encrypted, decrypt the encrypted display data based, at least in part, on the authentication code to protect the display data. Then, target device 120 may display the display data on a screen of target device 120.

FIG. 2 schematically shows an illustrative example of a source device that obtains permission information by capturing the permission information (which is an image code) displayed on a screen of a target device in accordance with at least some embodiments described herein.

As depicted in FIG. 2(A), a source device 210 may broadcast request information to one or more target devices including a target device 220. The request information may include a request for remote displaying of display data stored in source device 210. In some embodiments, target device 220 may display on a screen of target device 220 a question 230 that asks a user of target device 220 whether or not to permit the request from source device 210. By way of example, but not limitation, target device 220 may display question 230 on all or a part of the screen of target device 220 and/or overlapped with other contents being displayed on the screen of target device 220.

If the user of target device 220 determines to permit the request (i.e., select "YES" of question 230), target device 220 may generate permission information as explained above with reference to FIG. 1. By way of example, but not limitation, target device 220 may generate the permission information in a form of a QR code 240.

As depicted in FIG. 2(B), target device 220 may display QR code 240 on the screen of target device 220. By way of example, but not limitation, target device 220 may display QR code 240 on all or a part of the screen of target device 220 and/or overlapped with other contents being displayed on the screen of target device 220. Source device 210 may capture QR code 240 displayed on the screen of target device 220 using a camera (not shown) and then extract the permission information from the captured QR code 250.

FIG. 3 schematically shows an illustrative example of a source device that obtains permission information by a user input of the permission information (which is a text code) displayed on a screen of a target device in accordance with at least some embodiments described herein.

As depicted in FIG. 3(A), a source device 310 may broadcast request information to one or more target devices including a target device 320. The request information may include a request for remote displaying of display data stored in source device 310. In some embodiments, target device 320 may display on a screen of target device 320 a question 330 that asks a user of target device 320 whether or not to permit the request from source device 310. By way of example, but not limitation, target device 320 may display question 330 on all or a part of the screen of target device 320 and/or overlapped with other contents being displayed on the screen of target device 320.

If the user of target device 320 determines to permit the request (i.e., select "YES" of question 330), target device 320 may generate permission information as explained above with reference to FIG. 1. By way of example, but not limitation, target device 320 may generate the permission information in a form of a alphanumeric code 340.

As depicted in FIG. 3(B), target device 320 may display alphanumeric code 340 on the screen of target device 320. By way of example, but not limitation, target device 320 may display alphanumeric code 340 on all or a part of the screen of target device 320 and/or overlapped with other contents being displayed on the screen of target device 320. In some embodiments, source device 310 may obtain the permission information of target device 320. By way of example, but not limitation, the user of source device 310 may input alphanumeric code 340 through a key input function (not shown) of source device 310. Source device may then extract the permission information from the input of alphanumeric code 350.

Figure 4:
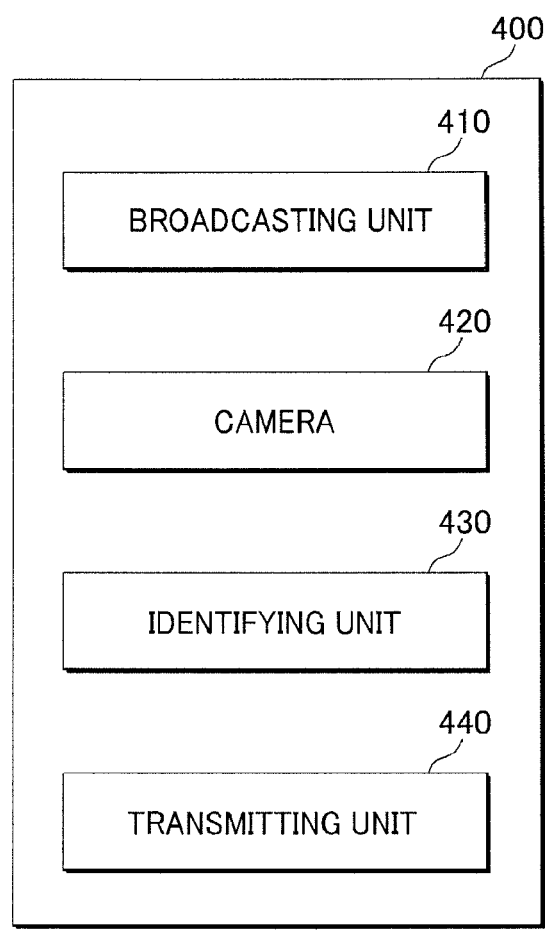
FIG. 4 shows a schematic block diagram illustrating an example of components for a source device.

FIG. 4 shows a schematic block diagram illustrating an example of components for a source device in accordance with at least some embodiments described herein. A source device 400 may include a broadcasting unit 410, a camera 420, an identifying unit 430 and a transmitting unit 440. Although illustrated as discrete components, various components may be divided into additional components, combined into fewer components, or eliminated, and accordingly, the claimed subject matter is not limited in these respects.

Broadcasting unit 410 may be configured to broadcast to one or more target devices request information that includes a request for displaying display data. By way of example, but not limitation, the request information may include information about source device 400, information about the display data and information about the user of source device 400. In some embodiments, source device 400 and the one or more target devices may be communicatively coupled through a wireless network, such as a Wi-Fi network.

Camera 420 may be configured to capture an image displayed on a screen of a target device of the one or more target devices. In some embodiments, the target device (not shown) permitting the request from source device 400 may generate permission information in a form of an image code (such as a QR code) and display the image code on a screen the target device. Camera 420 may capture the image code displayed on the screen of the target device to obtain the permission information.

Identifying unit 430 may be configured to identify the permission information from the captured image code. In some embodiments, identifying unit 430 may analyze the captured image code to extract the permission information.

Transmitting unit 440 may be configured to transmit to the target device an acknowledgement that a communication channel between source device 400 and the target device is established. In some embodiments, the permission information may include information about a communication network associated with the target device and a first authentication code to access the communication network. Thus, transmitting unit 440 may transmit the acknowledgement to the target device based, at least in part, on the information about the communication network and the first authentication code. Transmitting unit 440 may be further configured to transmit to the target device an acknowledgement that is encrypted based, at least in part, on the permission information. Source device 400 may encrypt the acknowledgement based, at least in part, on the first authentication code to access the communication network. Transmitting unit 440 may be further configured to transmit to the target device the display data based, at least in part, on the permission information. In some embodiments, the permission information may include a second authentication code to protect the display data, and source device 400 may encrypt the display data based, at least in part, on the second authentication code. Thus, transmitting unit 440 may transmit the display data encrypted based, at least in part, on the second authentication code to the target device. In some embodiments, the first authentication code and the second authentication code may be randomly generated by the target device.

In some embodiments, the target device may receive the display data for remote displaying. The target device may decrypt the encrypted display data using the second authentication of the permission information and display the decrypted display data on the screen of the target device. In some embodiments, the permission information may include an expiration time of the permission information. The expiration time may be a specific time or a time period. By way of example, but not limitation, if the expiration time is three hours, the communication network and the first authentication code (both of which are newly created for remote displaying) and/or the second authentication code to protect the display data may be automatically expired and no longer valid after three hours.

Figure 5:
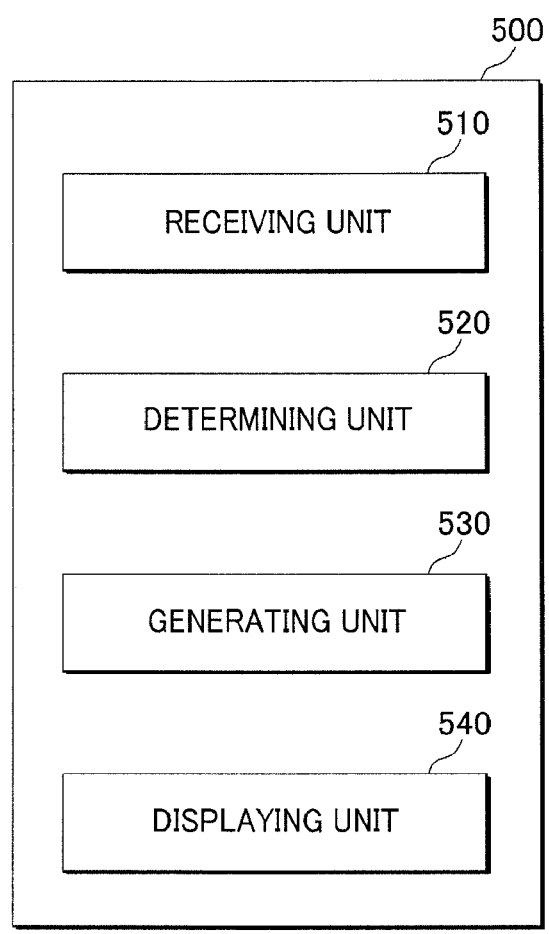
FIG. 5 shows a schematic block diagram illustrating an example of components for a target device.

FIG. 5 shows a schematic block diagram illustrating an example of components for a target device in accordance with at least some embodiments described herein. A target device 500 may include a receiving unit 510, a determining unit 520, a generating unit 530 and a displaying unit 540. Although illustrated as discrete components, various components may be divided into additional components, combined into fewer components, or eliminated, and accordingly, the claimed subject matter is not limited in these respects.

Receiving unit 510 may be configured to receive from a source device request information that includes a request for displaying display data. Further, receiving unit 510 may be configured to receive the display data from the source device. In some embodiments, receiving unit 510 may receive the request information that is broadcasted from the source device and may receive the display data that is directly transmitted from the source device.

Determining unit 520 may be configured to determine whether to permit the request for displaying the display data. In some embodiments, determining unit 520 may determine whether to accept the request based, at least in part, on at least one predetermined condition. By way of example, but not limitation, the at least one predetermined condition may include whether target device 500 is being used by other user, and whether the file type of the display data is supported by target device 500. If the at least one predetermined condition is met, determining unit 520 may determine to permit the request from the source device. On the other hand, in some embodiments, determining unit 520 may determine whether to accept the request based, at least in part, on a user input through a key input function of target device 500.

Generating unit 530 may be configured to generate permission information based, at least in part, on the determination of determining unit 520. By way of example, but not limitation, the permission information may include at least one selected from a group consisting of information about a communication network, an authentication code to access the communication network, an authentication code to protect the display data and an expiration time of the permission information.

Displaying unit 540 may be configured to display the permission information and the display data. In some embodiments, displaying unit 540 may display the permission information which may be an image code or a text code. By way of example, but not limitation, displaying unit 540 may display a QR code or an alphanumeric code associated with the permission information on a screen (not shown) of target device 500. By way of example, but not limitation, displaying unit 540 may display the permission information on all or a part of the screen of target device 500 and/or overlapped with other contents being displayed on the screen of target device 500.

In some embodiments, displaying unit 540 may display the display data which may be encrypted based, at least in part, on the permission information. In such cases, target device 500 may decrypt the encrypted display data based, at least in part, on the permission information, and then displaying unit 540 may display the decrypted display data.

Figure 6:
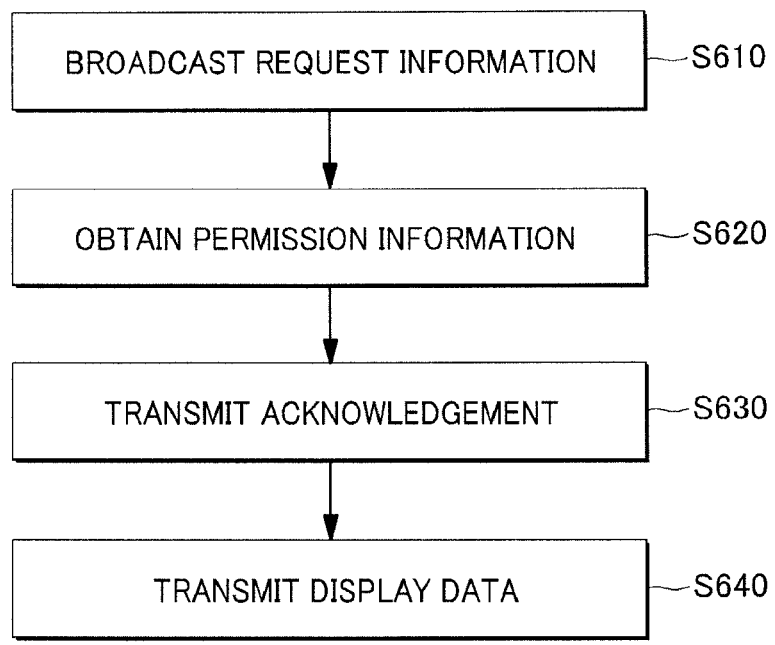
FIG. 6 shows an example flow diagram of a process performed under control of a source device.

FIG. 6 shows an example flow diagram of a process performed under control of a source device in accordance with at least some embodiments described herein. The method in FIG. 6 can be implemented in source device 400 including broadcasting unit 410, camera 420, identifying unit 430 and transmitting unit 440 discussed above. An example process may include one or more operations, actions, or functions as illustrated by one or more blocks S610, S620, S630 and/or S640. Although illustrated as discrete blocks, various blocks may be divided into additional blocks, combined into fewer blocks, or eliminated, depending on the desired implementation. Processing may begin at block S610.

At block S610, source device 400 may broadcast to one or more target devices including target device 500 request information that comprises a request for displaying display data stored in source device 400. By way of example, but not limitation, source device 400 and the one or more target devices may be communicatively coupled to a same network, and source device 400 may broadcast the request information to the one or more target device via the same network. The request information may include information about source device 400 and information about the display data. In some examples, if a communication channel between source device 400 and target device 500 was established before (and thus source device 400 may maintain information about target device 500), and if source device 400 wants to transmit the request to target device 500 only, then source device 400 may unicast the request specifically to target device 500. Processing may continue from block S610 to block S620.

At block S620, source device 400 may obtain permission information generated by target device 500. In some embodiments, the permission information may include information about a communication network, a first authentication code to access the communication network, a second authentication code to protect the display data and an expiration time of the permission information. In some embodiments, source device 400 may capture an image of the screen of target device 500 to obtain the permission information generated by target device 500. By way of example, but not limitation, source device 500 may capture the image of the screen including the QR code of the permission information, and analyze the captured image to extract the permission information from the captured image.

In some embodiments, source device 400 may obtain the permission based, at least in part, on an input of a user of source device 400 through an input component of source device 400. By way of example, the user of source device 400 may recognize the alphanumeric code of the permission information displayed on the screen of target device 500, and input the alphanumeric code into source device 400 using the input component of source device 400. Source device 400 may extract the permission information from the input alphanumeric code. Processing may continue from block S620 to block S630.

At block S630, source device 400 may transmit to target device 500 an acknowledgement that a communication channel between source device 400 and target device 500 is established. In some embodiments, source device 400 may encrypt the acknowledgement with the first authentication code or the second authentication code, and transmit the encrypted acknowledgement to target device 500 based, at least in part, on the information about the communication network. Processing may continue from block S630 to block S640.

At block S640, source device 400 may transmit to target device 500 the display data based, at least in part, on the permission information. In some embodiments, source device 400 may encrypt the display data with the second authentication code, and transmit the encrypted display data to target device 500 based, at least in part, on the information about the communication network.

Figure 7:
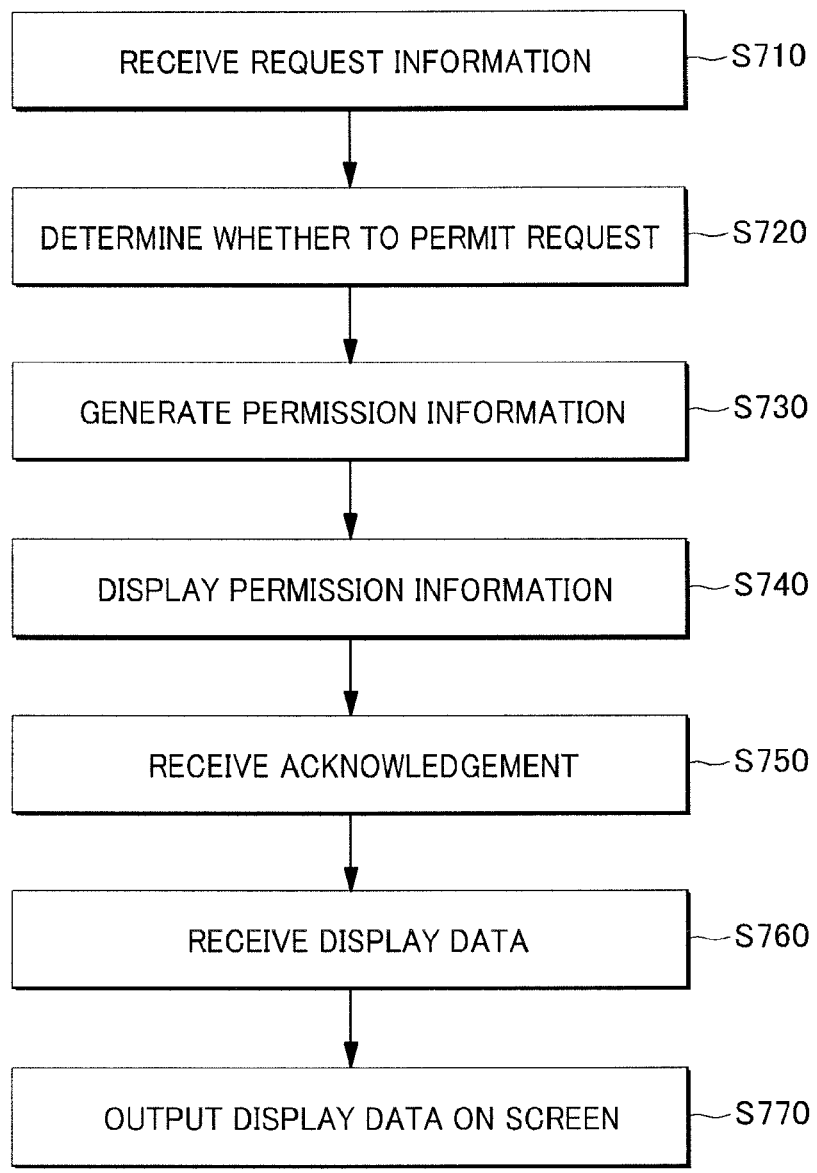
FIG. 7 shows an example flow diagram of a process performed under control of a target device.

FIG. 7 shows an example flow diagram of a process performed under control of a target device in accordance with at least some embodiments described herein. The method in FIG. 7 can be implemented in target device 500 including receiving unit 510, determining unit 520, generating unit 530 and displaying unit 540 discussed above. An example process may include one or more operations, actions, or functions as illustrated by one or more blocks S710, S720, S730, S740, S750, S760 and/or S770. Although illustrated as discrete blocks, various blocks may be divided into additional blocks, combined into fewer blocks, or eliminated, depending on the desired implementation. Processing may begin at block S710.

At block S710, target device 500 may receive from source device 400 request information that includes a request for displaying display data. The display data may be stored in source device 400. By way of example, but not limitation, target device 500 and source device 400 may be communicatively coupled to a same network, and target device 500 may receive the request information from source device 400 via the same network. The request information may include information about source device 400 and information about the display data. Processing may continue from block S710 to block S720.

At block S710, target device 500 may determine whether to permit the request from source device 400. In some embodiments, target device 500 may determine whether to accept the request based, at least in part, on at least one predetermined condition. By way of example, but not limitation, the at least one predetermined condition may include whether target device 500 is being used by other user, and whether the file type of the display data is supported by target device 500. If the at least one predetermined condition is met, target device 500 may determine to permit the request from source device 400. On the other hand, in some embodiments, target device 500 may determine whether to accept the request based, at least in part, on a user input through a key input function of target device 500. Processing may continue from block S720 to block S730.

At block S730, target device 500 may generate permission information based, at least in part, on the determining at block S720. In some embodiments, the permission information may include information about a communication network, a first authentication code to access the communication network, a second authentication code to protect the display data and an expiration time of the permission information. Target device 500 may randomly generate the first authentication code and the second authentication code. Processing may continue from block S730 to block S740.

At block S740, target device 500 may display the permission information on a screen of target device 500. In some embodiments, target device 500 may generate the permission information in a form of a QR code or an alphanumeric code and display the QR code or the alphanumeric code on the screen of target device 500. By way of example, but not limitation, target device 500 may display the permission information on all or a part of the screen of target device 500 and/or overlapped with other contents being displayed on the screen of target device 500. Processing may continue from block S740 to block S750.

At block S750, target device 500 may receive from source device 400 an acknowledgement that a communication channel between source device 400 and target device 500 is established. In some embodiments, the acknowledgement may be encrypted with the first authentication code or the second authentication code by source device 400, and target device 500 may decrypt the acknowledgement with the first authentication code or the second authentication code of the permission information. Processing may continue from block S750 to block S760.

At block S760, target device 500 may receive from source device 400 the display data based, at least in part, on the permission information. In some embodiments, the display data may be encrypted with the second authentication code by source data 400. Processing may continue from block S760 to block S770.

At block S770, target device 500 may display the display data received from source device 400 on the screen of target device 500. As discussed above, the received display data may be encrypted with the second authentication code, and target device 500 may decrypt the received display data with the second authentication code of the permission information and display the decrypted display data on the screen of target device 500.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
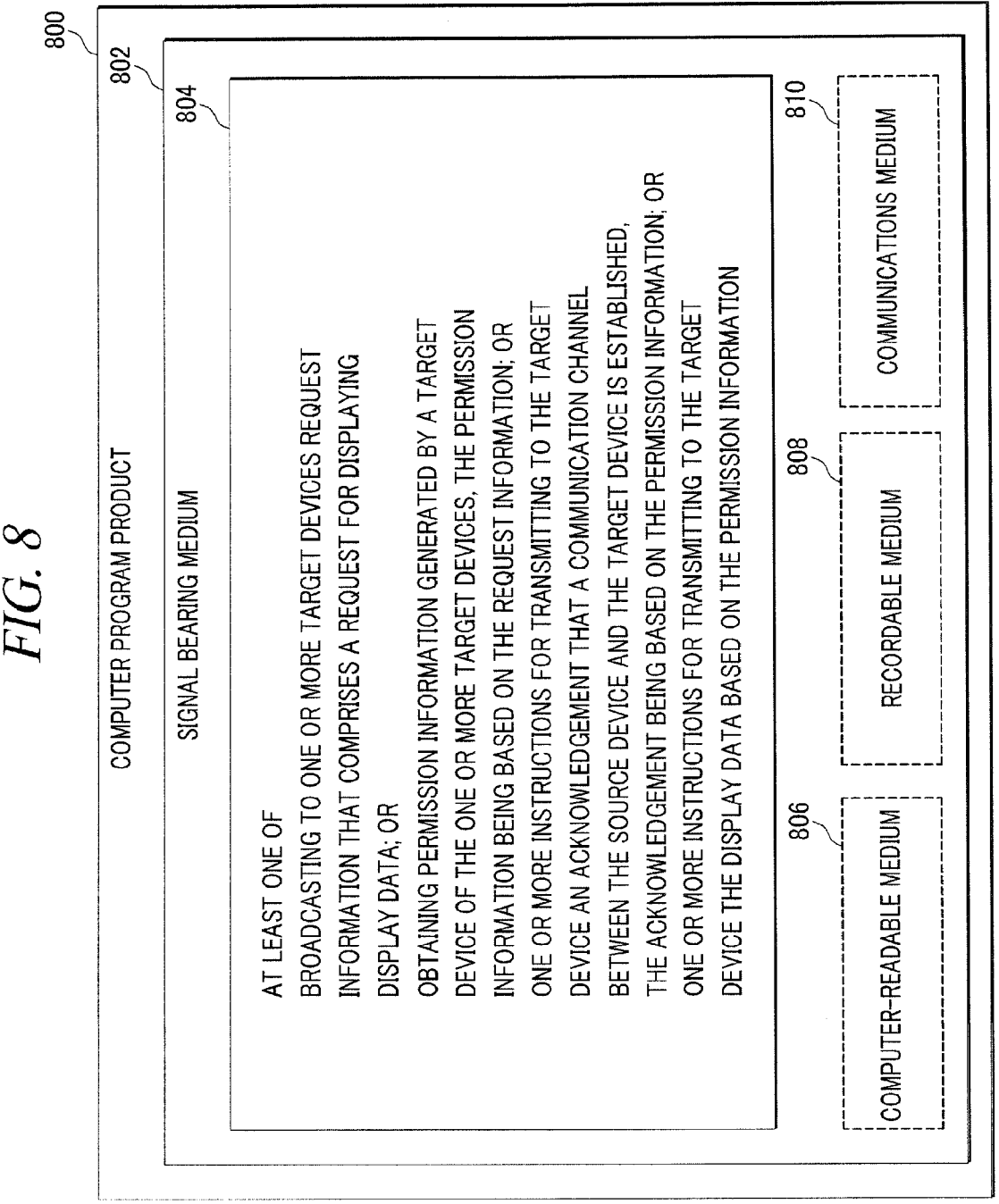
FIG. 8 illustrates computer program products that can be utilized to provide a remote displaying scheme for a source device.

FIG. 8 illustrates computer program products that can be utilized to provide a remote displaying scheme for a source device in accordance with at least some embodiments described herein. Program product 800 may include a signal bearing medium 802. Signal bearing medium 802 may include one or more instructions 804 that, when executed by, for example, a processor, may provide the functionality described above with respect to FIGS. 1-7. By way of example, instructions 804 may include: one or more instructions for broadcasting to one or more target devices request information that comprises a request for displaying display data; one or more instructions for obtaining permission information generated by a target device of the one or more target devices, the permission information based, at least in part, on the request information; one or more instructions for transmitting to the target device an acknowledgement that a communication channel between the source device and the target device is established, the acknowledgement based, at least in part, on the permission information; and one or more instructions for transmitting to the target device the display data based, at least in part, on the permission information. Further, by way of example, instructions 804 may include: one or more instructions for receiving from a source device request information that comprises a request for displaying display data; one or more instructions for determining whether to permit the request for displaying the display data; one or more instructions for generating a permission information based, at least in part, on the determining; and one or more instructions for displaying the permission information on a screen of the target device. Thus, for example, referring to FIG. 4 and FIG. 5, at least one of source device 400 and target device 500 may undertake one or more of the blocks shown in FIG. 8 in response to instructions 804.

In some implementations, signal bearing medium 802 may encompass a computer-readable medium 806, such as, but not limited to, a hard disk drive, a CD, a DVD, a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of at least one of source device 400 and target device 500 by an RF signal bearing medium 802, where the signal bearing medium 802 may be conveyed by a wireless communications medium 810 (e.g., a wireless communications medium conforming with the IEEE 802.11 standard).

Figure 9:
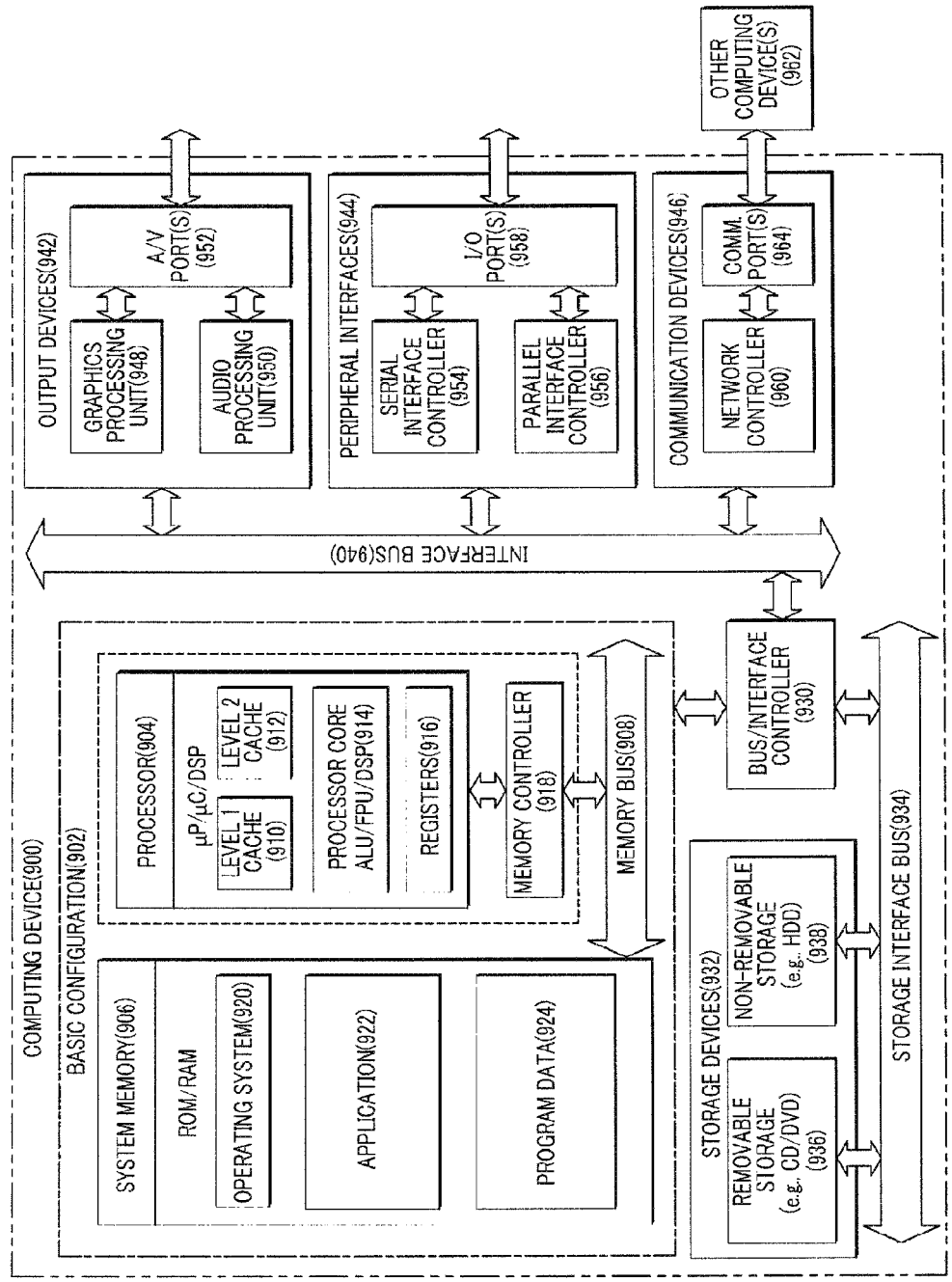
FIG. 9 is a block diagram illustrating an example computing device that can be utilized to provide a remote displaying scheme for a source device.

FIG. 9 is a block diagram illustrating an example of a computing device 900 that can be utilized to provide remote displaying in accordance with at least some embodiments described herein. In a very basic configuration 902, typically, computing device 900 may include one or more processors 904 and a system memory 906. A memory bus 908 may be used for communication between processor 904 and system memory 906.

Depending on the desired configuration, processor 904 may be of any type including, but not limited to, a microprocessor ($\mu$P), a microcontroller ($\mu$C), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including, but not limited to, volatile memory (such as RAM), nonvolatile memory (such as ROM, flash memory, etc.) or any combination thereof. System memory 906 may include an operating system 920, one or more applications 922, and program data 924.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, but not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
   broadcasting, by a source device, to one or more target devices request information that includes a request to display data;
   obtaining, by the source device, permission information generated by a target device of the one or more target devices, the permission information being based, at least in part, on the request information and a determination to permit the request to display the display data,
     wherein the permission information comprises a first authentication code to access a communication network and a second authentication code to protect the display data, and the first authentication code includes a code with which the source device accesses a wireless access point and the second authentication code includes a code with which the source device encrypts the display data;
   transmitting, by the source device, to the target device an acknowledgement that a communication channel between the source device and the target device is established, the acknowledgement being based, at least in part, on the permission information, wherein the acknowledgement is encrypted with the first authentication code; and
   transmitting, by the source device to the target device, the display data to be displayed on a screen of the target device, based at least in part on the permission information, wherein the display data is encrypted with the second authentication code.

2. The method of claim 1, wherein the obtaining includes:
   capturing an image displayed on the screen of the target device; and
   extracting the permission information from the captured image.

3. The method of claim 2, wherein the permission information is associated with a quick response (QR) code.

4. The method of claim 1, wherein the request information further comprises at least one of information about the source device, information about the display data and information about a user of the source device.

5. The method of claim 1, wherein at least one of the first authentication code and the second authentication code is randomly generated by the target device.

6. The method of claim 1, wherein the permission information further comprises an expiration time of the permission information.

7. The method of claim 1, wherein the display data is encrypted based, at least in part, on the permission information.

8. A method, comprising:
   receiving, by a target device, from a source device request information that includes a request to display data;
   determining, by the target device, whether to permit the request to display the display data, the determining being based, at least in part, on a status of the target device;
   generating, by the target device, a permission information based, at least in part, on the determining,
     wherein the permission information comprises a first authentication code to access a communication network and a second authentication code to protect the display data, and the first authentication code includes a code with which the source device accesses a wireless access point and the second authentication code includes a code with which the source device encrypts the display data; and
   displaying, by the target device, the permission information on a screen of the target device.

9. The method of claim 8, wherein the determining is based, at least in part, on a user input from an input component of the target device.

10. The method of claim 8, wherein the permission information is associated with at least one of a quick response (QR) code and a text code.

11. The method of claim 8, further comprising:
    receiving the display data from the source device; and
    displaying the display data on the screen of the target device.

12. The method of claim 11, wherein the display data is encrypted based, at least in part, on the permission information.

13. The method of claim 8, wherein at least one of the first authentication code and the second authentication code is randomly generated by the target device.

14. The method of claim 8, wherein the permission information further comprises an expiration time of the permission information.

15. A device, comprising:
a processor,
a camera communicatively coupled to the processor; and
a memory, communicatively coupled to the processor, the memory configured to store instructions for execution by the processor, wherein the instructions, when executed by the processor, cause the device to:
broadcast to one or more target devices request information that includes a request to display data;
obtain, by the camera, an image displayed on a screen of a target device of the one or more target devices;
identify permission information from the obtained image, the permission information being based, at least in part, on the request information and a determination to permit the request to display the display data,
wherein the permission information comprises a first authentication code to access a communication network and a second authentication code to protect the display data, and the first authentication code includes a code with which the device accesses a wireless access point and the second authentication code includes a code with which the device encrypts the display data;
transmit to the target device an acknowledgement that a communication channel between the device and the target device is established, the acknowledgement being based, at least in part, on the permission information, wherein the acknowledgement is encrypted with the first authentication code; and
transmit to the target device the display data to be displayed on the screen of the target device, based at least in part on the permission information, wherein the display data is encrypted with the second authentication code.

16. The device of claim 15, wherein the permission information is associated with a quick response (QR) code.

17. The device of claim 15, wherein the display data encrypted based, at least in part, on the permission information.

18. A device, comprising:
a receiving unit configured to receive from a source device request information that includes a request to display data;
a determining unit configured to determine whether to accept the request to display the display data, the determining being based, at least in part, on a status of the device;
a generating unit configured to generate a permission information based, at least in part, on the determination,
wherein the permission information comprises a first authentication code to access a communication network and a second authentication code to protect the display data, and the first authentication code includes a code with which the source device accesses a wireless access point and the second authentication code includes a code with which the source device encrypts the display data; and
a displaying unit configured to display the permission information.

19. The device of claim 18, wherein the determining unit is further configured to determine whether to accept the request based, at least in part, on a user input from an input component of the device.

20. The device of claim 18, wherein the receiving unit is further configured to receive the display data from the source device, and further wherein the displaying unit is further configured to display the display data.

21. A computer program product comprising a non-transitory medium having instructions to be implemented at a device, which, when executed, cause the device to:
broadcast to one or more target devices request information that includes a request to display display data;
obtain permission information generated by a target device of the one or more target devices, the permission information being based, at least in part, on the request information and a determination to permit the request to display the display data,
wherein the permission information comprises a first authentication code to access a communication network and a second authentication code to protect the display data, and the first authentication code includes a code with which the device accesses a wireless access point and the second authentication code includes a code with which the device encrypts the display data;
transmit to the target device an acknowledgement that a communication channel between the device and the target device is established, the acknowledgement being based, at least in part, on the permission information, wherein the acknowledgement is encrypted with the first authentication code; and
transmit to the target device the display data to be displayed on a screen of the target device, based at least in part on the permission information, wherein the display data is encrypted with the second authentication code.

22. The computer program product of claim 21, wherein the permission information is associated with at least one of a quick response (QR) code and a text code.

23. A non-transitory computer-readable storage medium having stored thereon computer-executable instructions that, in response to execution, cause a target device to perform operations, comprising:
receiving from a source device request information that comprises a request to display data;
determining whether to permit the request to display the display data, the determining being based, at least in part, on a status of the target device;
generating a permission information based, at least in part, on the determining,
wherein the permission information comprises a first authentication code to access a communication network and a second authentication code to protect the display data, and the first authentication code includes a code with which the source device accesses a wireless access point and the second authentication code includes a code with which the source device encrypts the display data; and
displaying the permission information on a screen of the target device.

24. The non-transitory computer-readable storage medium of claim 23, the operations further comprising:
receiving the display data from the source device; and
displaying the display data on the screen of the target device.

25. The non-transitory computer-readable storage medium of claim 23, wherein the determining is based, at least in part, on a user input from an input component of the target device.

26. The non-transitory computer-readable storage medium of claim 23, wherein the permission information is associated with at least one of a quick response (QR) code and a text code.

\* \* \* \* \*

UNITED STATES PATENT AND TRADEMARK OFFICE
CERTIFICATE OF CORRECTION

PATENT NO.         : 8,931,062 B2
APPLICATION NO.    : 13/505650
DATED              : January 6, 2015
INVENTOR(S)        : Lee It is certified that error appears in the above-identified patent and that said Letters Patent is hereby corrected as shown below:

In the Specification

In Column 1, Line 6, delete "stage application" and insert -- stage application filing under 35 U.S.C. §371 of International Application no. --, therefor.

In Column 5, Line 36, delete "a alphanumeric" and insert -- an alphanumeric --, therefor.

In Column 5, Line 43, delete "a alphanumeric" and insert -- an alphanumeric --, therefor.

In Column 7, Line 25, delete "a alphanumeric" and insert -- an alphanumeric --, therefor.

In Column 9, Line 62, delete "5610 to block 5620." and insert -- S610 to block S620. --, therefor.

In Column 10, Line 6, delete "source device 500" and insert -- source device 400 --, therefor.

In Column 10, Line 60, delete "S710," and insert -- S720, --, therefor.

In the Claims

In Column 15, Line 57, in Claim 1, delete "display data;" and insert -- display display data; --, therefor.

In Column 16, Line 38, in Claim 8, delete "display data;" and insert -- display display data; --, therefor.

In Column 17, Line 16, in Claim 15, delete "display data;" and insert -- display display data; --, therefor.

Signed and Sealed this
Fourth Day of August, 2015

Michelle K. Lee
*Director of the United States Patent and Trademark Office*

CERTIFICATE OF CORRECTION (continued)
U.S. Pat. No. 8,931,062 B2

In Column 17, Lines 50-51, in Claim 18, delete "display data;" and insert -- display display data; --, therefor.

In Column 18, Line 47, in Claim 23, delete "display data;" and insert -- display display data; --, therefor.